Patented Aug. 20, 1946

2,405,950

UNITED STATES PATENT OFFICE 2,405,950

PROCESS FOR POLYMERIZING OLEFINS

William Edward Hanford, Easton, Pa., assignor to E. I. du Pont de Nemours & Company, Wilmington, Del., a corporation of Delaware No Drawing. Application March 27, 1943, Serial No. 480,846

9 Claims. (Cl. 260—94)

This invention relates to chemical processes and particularly to improvements in the catalytic polymerization of organic compounds. More particularly, this invention relates to the polymerization of monoolefins and to novel catalysts therefor. Still more particularly, this invention relates to a novel class of catalysts for inducing the polymerization of monoolefins, either alone or together with other polymerizable compounds.

It is an object of this invention to provide a new class of catalysts for the polymerization of polymerizable monoolefins. Another object is to provide an improved method for polymerizing monoolefins alone, in admixture with other monoolefins, or with other organic compounds containing a polymer-producing linkage. Another object is to provide a novel class of catalysts for the polymerization of ethylene. Yet another object is to provide an improved method for preparing lubricating oils, greases, and solids of high melting point by polymerizing ethylene together with other monoolefins using a novel class of catalysts.

These and other objects hereinafter apparent are accomplished in accordance with this invention which provides a novel class of catalysts comprising hydrazines and hydrazinium compounds for the polymerization of monoolefinic hydrocarbons.

In accordance with this invention, the polymerization at elevated temperatures and pressures of polymerizable monoolefins can be carried out in the presence of a catalytic amount of a substance selected from the class of hydrazines and hydrazinium compounds.

By "hydrazines" as used herein, it is meant to include hydrazine itself, and organic substitution products of hydrazine in which one to four of the hydrogen atoms in the hydrazine are substituted by monovalent organic radicals.

By "a hydrazinium compound" is meant compounds which are derived from hydrazine and in which either one or both of the nitrogen atoms of the hydrazine nucleus are pentavalent.

The parent compound from which the catalysts are derived, and which is included within the class, is hydrazine itself, which can be considered as having the structural formula. $H_2N-NH_2$. Examples of the hydrazines are hydrazine and the alkyl, benzene sulfonyl, and acyl, (aliphatic acyl and aromatic acyl), substitution products thereof, such as the mono- and dimethyl hydrazines, benzyl hydrazine, acetyl and propionyl hydrazines, the mono, di, tri, and tetrabenzoyl hydrazines, pentanesulfonyl hydrazine, and toluyl hydrazine.

Included within the catalyst class are salts of hydrazines with organic and inorganic acids and the salts of the derivatives of hydrazine containing the stated group such as semicarbazide hydrochloride having the formula $NH_2CONH.NH_2HCl$. Examples of hydrazine salts are the hydrazine sulfates, hydrochlorides, acetates, sebacates, benzoates, propionates and phthalates, and examples of hydrazinium salts are alpha, alpha, alpha-trimethyl hydrazinium iodide; alpha, alpha, beta - trimethyl -(alpha, beta - dibenzyl)- hydrazinium iodide and similar hydrazinium compounds.

Of the hydrazine and hydrazinium catalysts, the group consisting of hydrazine sulfate, dibenzoyl hydrazine, and alpha, alpha, alpha-trimethyl hydrazinium iodide constitute a preferred class of catalysts for use in accordance with the present invention.

Any polymerizable monoolefinic hydrocarbon can be polymerized by means of the hydrazine and hydrazinium catalysts of the present invention. Suitable preferred polymerizable monoolefins are the normally gaseous monoolefins such as ethylene, propylene, and the various butylenes such as normal and isobutylene, and the like. The monoolefins can be polymerized singly, or in admixture with one another in any desired proportion. Of the normally gaseous monoolefins which are polymerized with the catalyst of the present invention, ethylene constitutes a preferred member, and accordingly the polymerization of ethylene with hydrazines and hydrazinium compounds will be further illustrated and described hereinafter.

The hydrazine and hydrazinum catalysts of the present invention are employed in small but definite catalytic amounts in the polymerization of ethylene and other polymerizable monoolefins in accordance with this invention. The catalysts are generally employed in amounts of at least 0.1% by weight based on total monomers, and preferably from about 0.1% to 2.0% by weight based upon total monomers. Usually, not more than about 5.0% by weight based on total monomers is required or useful. Amounts of catalyst as small as 0.001% by weight may produce some catalytic effect.

In the employment of hydrazines and hydrazinium compounds as catalysts for monoolefin polymerization in accordance with the present invention, the temperature of polymerization is usually at least 20° C., and not higher than 400° C. Generally, the temperature is maintained within the range of between 150° C. and 350° C., and preferably within the more restricted range of between 200° C. and 300° C.

Generally, in the polymerization of ethylene or other polymerizable monoolefin at elevated temperature in the presence of hydrazines and hydrazinium compounds in catalytic proportions, the pressure under which the reactants are maintained is likewise suitably elevated. The pressure is usually maintained as high as at least four atmospheres, generally within the much higher range of between 150 and 3000 atmospheres, and preferably within the range of 500 and 1,000 atmospheres. The upper limit of pressure is restricted only by the physical strength of the reaction vessel.

In carrying out the polymerization of ethylene or other polymerizable monolefin hydrocarbon in accordance with the present invention, it is preferred (but not essential) to utilize a normally liquid reaction menstruum in order to facilitate heat transfer, dispersion, and the like. Suitable liquid reaction media are water, benzene, iso-octane, tertiary-butyl alcohol, tertiary-amyl alcohol, toluene, and the like, either alone or in admixture. Preferably, the polymerization is carried out in a reaction menstruum comprising water.

In practicing this invention, a suitable vessel adapted to withstand high pressures and provided with heating and cooling means and means for agitating the contents thereof, is charged with the normally liquid reaction menstruum, such as water or water and one or more organic liquids, and the catalyst selected from the group of hydrazines or hydrazinium compounds. If desired, a buffering substance is added to prevent fluctuation in the pH of the contents during reaction. The pH is, if desired, adjusted by addition of suitable acid or alkali to the range preferred for polymerization, and the vessel is closed. Heating and agitation are started, and ethylene or other monoolefin hydrocarbon to be polymerized is admitted through a suitable inlet. Means for measuring the interior temperatures, such as controlling and recording thermocouples, are connected, and the reaction starts smoothly. Occasionally, a slight induction period is observed before reaction begins. A pressure decrease within the vessel is normally observed at this point, due to utilization of the ethylene or other polymerizable monoolefin hydrocarbon being polymerized. The pressure within the system is maintained throughout the reaction period either by injecting fresh monoolefin hydrocarbon, or by decreasing the free space in the reaction vessel through the addition of further quantities of normally liquid reaction menstruum. When the reaction is complete as evidenced by the cessation of ethylene absorption or other monoolefin hydrocarbon, the vessel is cooled, bled of excess gases, opened and the reaction contents discharged. The polymer is isolated from the reaction mixture by means known to the art, such as by washing on a mill of the rubber mill type, solvent extraction, steam distillation, drying and the like. When the products are liquid hydrocarbons, they can be separated from the menstruum by filtration or sedimentation and then further purified by steam distillation, fractional distillation, decolorizing with known decolorizing agents such as activated carbon, and the like.

The equipment used in the practice of this invention may be made of or lined with mild steel, provided the surface which comes in contact with the reaction medium is smooth and highly polished, but preferably the equipment is constructed of or lined with glass, stainless steels, silver, aluminum or similar materials not corroded by the reactants or having an undesirable effect upon the course of the reaction.

The practice of this invention is illustrated by the following examples in which parts are by weight unless otherwise designated, although the invention is not limited thereto:

*Example 1.*—A stainless steel-lined high-pressure reaction vessel is swept with oxygen-free nitrogen and is charged with 100 parts of oxygen-free water and 0.5 part of hydrazine sulfate, care being taken to exclude atmospheric oxygen during the loading operation. The pH of the aqueous charge is adjusted from 3.9 to 1.0 by addition of a small amount of dilute sulfuric acid and the vessel is closed. After removal of the nitrogen by evacuation, the reactor is charged with ethylene to a pressure of 175 atmospheres, and heating and agitation are started. The temperature of the reactor is then raised to approximately 225° C. and the pressure is adjusted to approximately 900 atmospheres by injection of additional ethylene. During a reaction period of 16.5 hours, throughout which the temperature is held at 217° to 288° C. and the pressure at 515 to 990 atmospheres by periodically repressuring with ethylene, there is a total observed pressure drop of 3010 atmospheres. When ethylene is no longer absorbed and the polymerization is complete, the reactor is cooled to room temperature and the pressure released to atmospheric by bleeding off excess ethylene. The reactor is opened, and the contents discharged. From the reaction mixture there is obtained 139 parts of a solid ethylene polymer having a molecular weight of approximately 600. The polymer fuses to a fluid melt slightly below 100° C.

*Example 2.*—A stainless steel-lined high-pressure reaction vessel is swept with oxygen-free nitrogen and is charged with 100 parts of tertiary butyl alcohol and 0.5 part of hydrazine sulfate, care being taken to exclude atmospheric oxygen during the loading operation. After removal of the nitrogen by evacuation, the reactor is charged with ethylene to a pressure of 150 atmospheres and heating and agitation are started. The temperature of the reactor is then raised to approximately 250° C. and the pressure is adjusted to approximately 900 atmospheres. During a reaction period of 14 hours, throughout which the temperature is held at 248° to 250° C. and the pressure at 850 to 1000 atmospheres by periodically repressuring with ethylene, there is a total observed pressure drop of 770 atmospheres. When the polymerization is complete the reactor is cooled to room temperature and any unreacted ethylene bled off. The reactor is opened and discharged. From the reaction mixture there is recovered 46.5 parts of an ethylene polymer having a molecular weight of approximately 1500 and melting at 90° to 95° C. Upon analysis the product is found to contain 85.3% carbon and 14.3% hydrogen.

*Example 3.*—A high-pressure reaction vessel lined with stainless steel is charged with 60 parts of isobutylene and 0.5 part of hydrazine sulfate, care being taken to exclude atmospheric oxygen during the loading operation. After the reactor is closed the nitrogen is removed by evacuation, ethylene is pumped in to a pressure of 150 atmospheres, and heating and agitation are started. The temperature of the reactor is then raised to approximately 250° C. and the pressure is adjusted to approximately 900 atmospheres. During a reaction period of 14.5 hours, throughout which the reaction is held at 248° to 250° C. and the pressure at 860 to 980 atmospheres by periodically repressuring with ethylene, there is a total observed pressure drop of 600 atmospheres. At the end of the reaction period the reactor is cooled to room temperature, excess ethylene bled off, and the contents discharged. From the reaction mixture there is obtained 35 parts of an ethylene polymer having the consistency of a grease.

*Example 4.*—A high-pressure reaction vessel lined with stainless steel is flushed with oxygen-free nitrogen and is charged with 100 parts of oxygen-free water and 0.5 part of hydrazine sulfate, care being taken to exclude atmospheric oxygen during the loading operation. After removal of the nitrogen by evacuation, the reactor is charged with ethylene to a pressure of approximately 67 atmospheres, and heating and agitation are started. When the temperature of the reactor has reached approximately 250° C. the pressure is adjusted to 201 atmospheres. During a reaction period of 15 hours, throughout which the temperature is maintained at 240° to 250° C. and the pressure at 167.5 to 201 atmospheres, there is a total observed pressure drop of 61.3 atmospheres. When the polymerization is complete, the reactor is cooled to room temperature, excess ethylene bled off, and the reactor discharged. From the reaction mixture there is recovered 10 parts of an ethylene polymer having the consistency of a heavy grease.

*Example 5.*—Ethylene is polymerized in the presence of 0.5 part of N,N'-dibenzoyl hydrazine at 247° to 253° C. and 710 to 955 atmospheres pressure in the manner described in Example 1. A total ethylene pressure drop of 1835 atmospheres is observed resulting in the formation of 141.4 parts of a solid polymer of ethylene. This product is soluble to the extent of 10 to 12% in common organic solvents, and from such solutions tough, clear films can be cast. Films can also be prepared from this material by pressing between plates heated at approximately 120° C.

*Example 6.*—Into a suitable, stainless steel, high-pressure vessel is charged 100 parts of deoxygenated, distilled water, 60 parts of propylene, and 0.4 part hydrazine sulfate. This loading operation is conducted under a blanket of oxygen-free nitrogen. The pH of the charge is then adjusted from 3.0 to 2.3 by the addition of a small amount of dilute sulfuric acid. The reactor is heated to 250° C. and ethylene is admitted to a pressure of approximately 900 atmospheres. During a reaction period of 15.25 hours, throughout which the temperature is maintained between 249° C. and 251° C. and the pressure at 840 to 970 atmospheres by periodically repressuring with ethylene, there is a total pressure drop of 1845 atmospheres. After completion of the reaction, the reactor is cooled, opened, and the contents discharged. From the reaction mixture there is recovered 91 parts of a viscous, oily, polymer of propylene and ethylene. After purification by steam distillation to remove volatile constituents, treatment with a decolorizing agent, and drying, this oil is found to have a viscosity of 40° C. of 1191 centistokes and at 100° C. of 89 centistokes (method of Dean and Davis, Ind. and Eng. Chem. 32, 102 (1940) and ASTM D445-39T). The oil therefore has a viscosity index of 118 to 120. The pour-point is +10° F. The coefficient of static friction is 0.12. In addition to this product, about 5 parts of hydrocarbons boiling within the kerosene range are obtained in the steam distillation process.

*Example 7.*—Fifty parts of styrene, 100 parts of oxygen-free water, and 0.4 part of hydrazine sulfate are charged into a stainless steel reactor capable of withstanding high pressure, care being taken to exclude atmospheric oxygen during the loading operation. This charge occupies about ⅓ of the total volume of the reactor. The pH is then adjusted from 3.1 to 1.6 by the addition of dilute hydrochloric acid. Following closure of the vessel, the temperature is raised to approximately 250° C., ethylene is admitted to a pressure of about 900 atmospheres, and heating and agitation are started. The temperature is adjusted to between 245° and 258° C. and the pressure to between 750 and 965 atmospheres, where it is maintained by periodically repressuring with ethylene for 16.5 hours. During this time a total pressure drop of 2860 atmospheres is observed. At the end of the reaction period, the reactor is cooled, the excess gaseous reactants are bled off, and the contents removed. There is obtained 167 parts of a soft wax-like polymer of styrene with ethylene. This material has an intrinsic viscosity of 0.09 (⅛% xylene solution at 85° C.).

*Example 8.*—A suitable stainless steel high-pressure reaction vessel is swept with oxygen-free nitrogen and charged with 100 parts of deoxygenated distilled water, 60 parts of propylene, and 0.4 part of hydrazine dihydrochloride. This charge occupies about ⅓ of the total volume of the vessel. After closure is effected, the reactor is heated to 250° C. and pressured with ethylene to about 1000 atmospheres. These conditions of temperature and pressure are maintained while the vessel is agitated over a period of 16 hours. During this time, a total pressure drop of 2600 atmospheres is observed. This is continually compensated by the addition of more ethylene. When the vessel is cooled, the excess gases bled off and the contents of the reactor removed, there is found 125 parts of liquid ethylene/propylene polymer suitable for use as a transmission lubricant. This material is purified by steam distillation and treated with a decolorizing agent. It has a S. A. E. viscosity of 250 and a viscosity index of 120, as determined by the method given in Example 6.

*Example 9.*—A stainless steel vessel capable of withstanding high pressure is charged with 100 parts of oxygen-free water, 75 parts of isobutylene and 0.4 part of hydrazine sulfate, care being taken to exclude atmospheric oxygen during the loading operation. This charge occupies about ⅓ of the total space in the reactor. After closure is effected, the reactor is raised to a temperature of approximately 250° C. and ethylene is admitted to a pressure of approximately 900 atmospheres. The contents of the reactor are kept well-stirred by agitating the vessel. Over a period of 11.0 hours the temperature is maintained between 245° and 251° C. and the pressure between 870 and 980 atmospheres by repressuring with ethylene. On cooling the reactor at the end of the reaction period, bleeding off the unused ethylene and discharging the reactor contents, there is found 75 parts of a liquid ethylene/isobutylene polymer. After drying and clarification, the product is found to have an S. A. E. viscosity of 25, a viscosity index of 112 and a film strength value of 750 (Cornell machine).

*Example 10.*—A mixture of 100 parts of oxygen-free water, 50 parts of propylene, 100 parts of isobutylene, and 0.4 part of semicarbazide hydrochloride is charged under a blanket of nitrogen into a stainless steel reaction vessel. The reaction vessel, after removal of the nitrogen, is closed, pressured with ethylene and heating and agitation are started. The temperature is adjusted to between 245° and 250° C. and the pressure to approximately 1000 atmospheres, where it is maintained for 15.25 hours by periodically repressuring with ethylene. During this period of reaction there is a total observed pressure drop of 1150 atmospheres. After completion of the reaction the reaction vessel is opened and discharged. From the reaction mixture there is recovered 50 parts of a liquid hydrocarbon polymer having an S. A. E. viscosity of 20 and a viscosity index of 108.

*Example 11.*—Sixty parts of isobutylene are polymerized with ethylene under a pressure of from 800 to 1000 atmospheres in the presence of 0.4 gram of hydrazine sulfate, according to the above described procedure, at a temperature of 300° C. In this case, 142 parts of an oil having an S. A. E. viscosity of 30 and a viscosity index of 123, are obtained.

*Example 12.*—A stainless steel lined reaction vessel is swept with nitrogen and is charged with 100 parts of water and 0.4 part of hydrazine sulfate. The pH of this mixture is adjusted from 3.3 to 2 by the addition of a few drops of dilute sulfuric acid. The reaction vessel is closed, evacuated to remove residual nitrogen and 64 parts of ethylene are added by expansion from a high pressure storage tank. Next 61 parts of propylene are injected, and heating and agitation are started. During a reaction time of 16.1 hours, throughout which the temperature is maintained at 248° to 251° C. and the pressure at 850 to 950 atmospheres, there is a total observed pressure drop of 605 atmospheres. The pressure is maintained in the desired range throughout the run by the periodic injection of additional liquid propylene. The vessel is then cooled, bled of excess gases, opened, and the reaction mixture discharged. The reaction mixture, amounting to 203 parts has a pH of 6.2. Steam distillation gives 4 parts of a steam volatile organic liquid which boils at 165° to 230° C., is unsaturated to bromine, and is soluble in cold concentrated sulfuric acid. The non-steam volatile product is a heavy oil which amounts to 69 parts.

*Example 13.*—A stainless steel lined high pressure vessel is charged with 100 parts of 1,3-dioxolane and 0.2 part of hydrazine sulfate. The vessel is closed, evacuated, pressured with ethylene, and heating and agitation are started. During a reaction time of 15.5 hours, throughout which the temperature is maintained at 220° to 239° C., and the pressure at 840 to 930 atmospheres by periodically repressuring with ethylene, there is a total observed pressure drop of 130 atmospheres. The vessel is then cooled, bled of excess ethylene, opened, and the contents discharged. This reaction mixture yields 42 parts of a polymer having a molecular weight of 615 (ebullioscopic) and melting at 90° C., after prior softening at 40° to 50° C.

In carrying out the polymerization of ethylene or other polymerizable monoolefins employing the hydrazines and hydrazinium catalysts of the present invention, it is sometimes desirable to employ dispersing or surface-active agents to maintain the reactants and the normally liquid reaction menstruum in an emulsified state. This is especially desirable when the ethylene or other polymerizable monoolefin hydrocarbon is polymerized together with another organic compound containing at least one polymer-producing linkage, as hereinafter described in greater detail. Examples of suitable dispersing agents are starch, water-soluble salts of higher alkyl sulfates and alkane sulfonates, alkali metal salts of sulfonated mineral oils, and non-ionic water-soluble compounds as are obtained by the condensation of several moles of ethylene oxide with one mole of long-chain amines, alcohols, phenols, acids, or hydroxylated aliphatic compounds.

In carrying out the polymerization in an aqueous medium, it is generally preferable to operate within the neutral to acidic range, that is at a pH of 7 or less. However, the catalysts of the present invention are also effective at a pH in excess of 7. When such catalytic salts as hydrazine sulfate or dihydrochloride are used, they are sufficiently acidic to give the resulting aqueous solution a pH value of less than 7. When employing a hydrazine derivative only slightly soluble in water, such as dibenzoyl hydrazine and hydrazine salts of weak acids such as sebacic acid, the pH value of the aqueous charge is preferably adjusted to a value less than 7 by adding small amounts of acetic acid or other acids such as propionic, formic, hydrochloric, sulfuric, and the like, as well as such acidic salts as monosodium phosphate, monosodium sulfate, and the like.

As hereinbefore mentioned, it is generally preferred to avoid radical changes in pH during the course of the polymerization. It is advisable therefore, although not essential, to include in the liquid reaction menstruum small amounts of material having a buffering action. Since the effectiveness of the catalyst is not restricted to any particular pH range, buffering agents of either the acid or alkaline type can be employed, for example, an alkaline pH can be maintained by the use of such buffers as borax, disodium phosphate, sodium carbonate and the like. An acid or slightly acidic pH can be maintained by using acid salts such as sodium acid phthalate, monosodium phosphate and the like.

The ethylene or other polymerizable monoolefinic hydrocarbons employed in the practice of this invention should preferably be as pure as can be obtained, but small amounts of impurities such as methane, ethane, nitrogen, propane and oxygen have no highly deleterious effect upon the catalysts or the reaction. However, the oxygen content of the ethylene or other polymerizable monoolefin is desirably less than 1,000 parts oxygen per million parts of ethylene or other monoolefin, and preferably the oxygen content is kept below a maximum of not more than 200 parts per million. Less than 20 parts per million of oxygen in the ethylene gives satisfactory results. At the more elevated temperatures and pressures at which the present invention can be practiced, oxygen can function as a cooperative catalyst with the hydrazines and hydrazinium compounds of the present invention, provided that the oxygen content is between 20 and 200 parts per million as hereinbefore indicated.

The hydrazine and hydrazinium catalysts of the present invention can function in the presence of other catalysts known to catalyze the polymerization of ethylene or other polymerizable monoolefin hydrocarbons, suitable additional catalysts being peroxygen-type compounds such as benzoyl peroxide, hydrogen peroxide, alkyl dioxides and the like.

Although the description and Examples 1 to 12 inclusive have described and illustrated the polymerization of ethylene or other monoolefinic hydrocarbon with the catalysts of the present invention either alone or in combination with one or more other polymerizable monoolefinic hydrocarbons, the invention is not restricted thereto, but other organic compounds containing at least one polymer-producing linkage can be polymerized together with polymerizable monoolefinic hydrocarbons by means of hydrazines and hydrazinium compounds. Likewise, the invention is applicable to the polymerization of a polymerizable monoolefinic hydrocarbon in the presence of one or more "active solvents" as hereinafter described.

By the expression "organic compound containing at least one polymer-producing linkage" is meant compounds other than monoolefins which contain the ethylenic linkage, and compounds containing carbon-oxygen unsaturation such as aldehydes, ketones, carbon monoxide and the like. Examples of compounds coming within the scope of the term "organic compounds containing at least one polymer-producing linkage" are diolefins such as butadiene - 1,3, isoprene, and 2 - chlorobutadiene - 1,3; vinylidene compounds such as vinylidene chloride; tetrafluoroethylene; the anhydrides, esters, nitriles and amides of maleic and fumaric acids; the vinyl halides, esters and acetals, such as vinyl chloride, vinyl acetate, vinyl chloroacetate, vinyl dimethylacetate, and vinyl trimethylacetate; the vinyl thiol esters such as vinyl thiolacetate, vinyl thiolpropionate, vinyl thiolbutyrate and the like; the vinyl ketones, N-vinyl amides and vinyl hydrocarbons, examples of which are vinyl methyl ketone, vinyl ethyl ketone, N-vinyl phthalimide, N-vinylmaleimide, N-vinylsuccinimide, styrene, and limonene; vinyl esters of unsaturated carboxylic acids such as vinyl hexenoate, vinyl crotonate, and the like; the acrylic and methacrylic acids, esters, amides, nitriles, and acid halides as well as the polymerizable compounds in which a halogen replaces the alpha-methyl group of methacrylic acid; and other ethenoid compounds of the types illustrated which are known to be polymerizable alone or in the presence of monoolefinic hydrocarbons such as ethylene.

As above mentioned, the hydrazine and hydrazinium catalysts of the present invention are effective in catalyzing the polymerization of ethylene or other polymerizable olefinic hydrocarbons in the presence of solvents of the "active type." By the expression "solvents of the active type" is meant organic compounds which are normally known as solvents but which influence the course of olefin polymerization, or enter into the polymer molecule. Suitable examples of solvents of the active type are methanol, ethanol, ethers, acids, aldehydes, acetals such as 1,3-dioxolane, ketones, esters, and halogenated aliphatic hydrocarbons such as chloroform, carbon tetrachloride and the like.

The catalysts are also suitable for polymerizing ethylene in the presence of hydrogen and especially in the presence of from 0.1 to 10.0% by weight hydrogen based on the ethylene used, the conditions for effecting the polymerization being similar to those used for the polymerization of ethylene.

Since the catalysts of the present invention selected from the class of hydrazines and hydrazinium compounds catalyze the polymerization of ethylene or other monoolefin hydrocarbons alone or in admixture, in a very smooth fashion, and generally do not show long induction periods, the polymerization of monoolefins employing the catalyst of the present invention can be very efficiently carried out in a continuous manner. Thus, the whole polymerization mixture and catalyst can be passed through a reactor maintained under appropriate polymerization conditions, or the reactants can be separately pumped through a mixing chamber and then through a reactor or preferably the reactants can be pumped into and through a mixing chamber while introducing the catalyst solution or suspension immediately prior to entering the reactor. However, the catalyst solution or suspension can be introduced at intermediate points throughout the reactor to control the course of the polymerization as an alternative method for carrying out polymerization in a continuous fashion. The polymerization of ethylene or other polymerizable monoolefins with the catalyst of the present invention is an exothermic reaction, and therefore, a continuous polymerization process affords a more exact temperature control than can be secured in batch operations.

By the employment of hydrazines and hydrazinium compounds as catalysts for the polymerization of ethylene or other polymerizable monoolefin hydrocarbons alone or in admixture, very valuable products within the range of from lubricating oils through greases to solid, tough, products of resinous character are produced. The products are useful as lubricants, greases, extruded and molded objects, wrapping foil films, both liquid and solid insulating materials in the electrical and heat insulating arts, filaments, and other purposes known to the art in which high molecular polymers are useful. Thus, plastics, elastomers, and resins can be produced employing the catalysts of the present invention. One of the striking advantages of the present catalysts is that they permit the production in a single step process of high quality lubricants which do not require further refining, alteration or chemical treatment.

As many apparently differing embodiments of this invention can be made without departing from the spirit and scope thereof, it is to be understood that various changes can be made in the detailed practice of the invention without departing therefrom.

What is claimed is:

1. In a process involving polymerization of a normally gaseous monoolefin at an elevated temperature and pressure, the step which comprises carrying on the polymerization of such a monoolefin at a temperature of from 20 to 400° C. under an elevated pressure between 150 and 3000 atmospheres in the presence of 0.001 to 5.0% by weight of a catalyst selected from the class consisting of hydrazines and hydrazinium compounds.

2. In a process involving polymerization of ethylene at an elevated temperature and pressure, the step which comprises carrying on such ethylene polymerization at a temperature of from 20 to 400° C. under an elevated pressure between 150 and 3000 atmospheres in the presence of 0.001 to 5.0% by weight of a catalyst selected from the class consisting of hydrazines and hydrazinium compounds.

3. In a process involving polymerization of a normally gaseous monoolefin at a temperature between 20 and 400° C. and at a pressure of at least 4 atmospheres, the step which comprises carrying on the polymerization of such a monoolefin in the presence of a catalyst selected from the class consisting of hydrazines and hydrazinium compounds.

4. In a process involving polymerization of ethylene at a temperature between 20 and 400° C. and at a pressure of at least 4 atmospheres, the step which comprises carrying on such ethylene polymerization in the presence of a catalyst selected from the class consisting of hydrazines and hydrazinium compounds.

5. In a process involving polymerization of ethylene at a temperature between 20 and 400° C. and a pressure of at least 4 atmospheres, the step which comprises carrying on such ethylene polymerization in the presence of a catalyst comprising hydrazine sulfate.

6. In a process involving polymerization of ethylene at a temperature between 20 and 400° C. and at a pressure of at least 4 atmospheres, the step which comprises carrying on such ethylene polymerization in the presence of a dibenzoyl hydrazine.

7. In a process involving polymerization of ethylene at a temperature between 20 and 400° C. and at a pressure of at least 4 atmospheres, the step which comprises carrying on such ethylene polymerization in the presence of $\alpha\alpha\alpha$-trimethylhydrazinium iodide.

8. The process of claim 4, wherein the ethylene is normally gaseous, together with propylene, to yield a lubricant.

9. The process of claim 4, wherein the ethylene is normally gaseous, together with isobutylene, to yield a lubricant.

WILLIAM EDWARD HANFORD.